United States Patent

Deschenes et al.

[11] Patent Number: 5,986,440
[45] Date of Patent: Nov. 16, 1999

[54] LOAD POWER CONTROL METHOD USING A PHASE CONTROL SYSTEM, AND DEVICE THEREFOR

[75] Inventors: Laurent Deschenes, Saint-Germain-la-Blanche-Herbe; Michel Guinet, Caen Cedex, both of France

[73] Assignee: Moulinex S.A., Paris, France

[21] Appl. No.: 09/077,033

[22] PCT Filed: Nov. 15, 1996

[86] PCT No.: PCT/FR96/01808

§ 371 Date: May 18, 1998

§ 102(e) Date: May 18, 1998

[87] PCT Pub. No.: WO97/19511

PCT Pub. Date: May 29, 1997

[30] Foreign Application Priority Data

Nov. 17, 1995 [FR] France ................................... 95 13675

[51] Int. Cl.⁶ ................................ G05F 1/10; G05F 1/00; G05B 24/02
[52] U.S. Cl. ............................ 323/237; 323/322; 315/291
[58] Field of Search ..................................... 323/237, 238, 323/239, 300, 320, 241, 322; 315/291

[56] References Cited

U.S. PATENT DOCUMENTS 4,980,836 12/1990 Carter et al. .

5,796,245 8/1998 Beaulieu et al. ..................... 323/322

FOREIGN PATENT DOCUMENTS 0 560 255 9/1993 European Pat. Off. .
41 30 532 3/1993 Germany .

OTHER PUBLICATIONS

D. Berghanel, "Schwingungspaketsteuerung zur Leistungsregulierung elektrischer Maschinen", pp. 389–391, Radio Fernsehen Elektronik, vol. 33, No. 6, Jun. 6, 1984.

*Primary Examiner*—Edward H. Tso
*Assistant Examiner*—Rajahkant B. Patel
*Attorney, Agent, or Firm*—Young & Thompson

[57] ABSTRACT

A method for controlling the power of a load (1) powered from a source of AC voltage U having a period T using a phase control system, wherein, for a predetermined set power, a sequence of an integer p of elements, where p is greater than 1, is periodically delivered to the load (1), each element, numbered i, of the sequence being characterized by an integer $n_i$ with a half-period T/2 during which the AC voltage U is switched according to a series of different phase angles $\alpha_i$ from $\alpha_1$ to $\alpha_n$ corresponding to respective durations $t_i$ from $t_l$ to $t_n$ during which the load (1) is cut off from the power supply. The phase angles $\alpha_i$ of element i and $\alpha_{i+1}$ of element i+1 have similar repetitive values so that the mean current is zero over a complete cycle.

7 Claims, 1 Drawing Sheet

LOAD POWER CONTROL METHOD USING A PHASE CONTROL SYSTEM, AND DEVICE THEREFOR

FIELD OF THE INVENTION

The present invention relates to a process for controlling the power supplied to a load fed from a source of ac voltage U of period T via a generalized phase adjustment system.

BACKGROUND OF THE INVENTION

To satisfy the standards relating to the limit of disturbances in the network by electrical apparatus which are of the resistive or inductive type or a combination of these two types, the applicant has previously described a first control process which is the object of French patent application filed under No. 94 12833.

In such a process, for a previously set nominal value, there is delivered successively to said load, periodically a sequence of a whole number p of elements, p being greater than one, each element, of number i, of the sequence being characterized by the whole number $n_i$ of periods T during which the ac voltage U is symmetrically chopped at a phase angle $\alpha_i$ corresponding to a duration $t_i$ during which the load is not supplied, the consecutive phase angles $\alpha_i$ of the element i and $\alpha_{i+1}$ of the element i+1 being different and the combination of the angles $\alpha_i \ldots \alpha_i \ldots \alpha_p$ being selected such that it satisfies the standards.

This first control process could give rise in certain cases of use and particularly in electrical motors, of mechanical vibrations due to the cycle of modulation of the phase angles.

SUMMARY OF THE INVENTION

The present invention seeks to avoid particularly this drawback and has for its object a simple and effective control process for the power supplied to a load no matter what the resistive type such as a heating resistance, or no matter what the inductive type such as an electric motor.

According to the invention, for a preliminarily fixed nominal power, there is delivered successively to said load, periodically a sequence of a whole number p of elements, p being greater than one, each element, of number i, of the sequence being characterized by the whole number $n_i$ of half-periods T/2 during which the ac voltage U is chopped according to different consecutive phase angles $\alpha_i$ from $\alpha_1$ to $\alpha_n$ corresponding respectively to durations $t_i$ from $t_1$ to $t_n$ during which the load is not supplied, the phase angles $\alpha_i$ of the element i and $\alpha_{i+1}$ of the element i+1 being similar repetitive values such that the mean current will be zero over a complete cycle whilst supplying the desired power to the load.

Thanks to this new process, the standards are satisfied no matter what the loads, as to the limitation of disturbances created in the network by the electrical apparatus, particularly the standards EN60555-2, CEI555-2, as well as their successors EN61000-3-2 and CEI1000-3-2, limiting the level of harmonic currents, and the standards EN60555-3, CEI555-3, as well as their successors EN61000-3-3 and CEI1000-3-3, limiting the relative variations of the voltage as a function of the number and these variations per unit of time for an impedance source defined by the standard and which are the cause of known disturbances called "FLICKER".

According to another important characteristic of the invention, the whole number $n_i$ of half-periods T/2 is uneven.

Thus, in the particular use in motors, there is a considerable improvement in the problems of mechanical vibrations particularly by creating higher frequencies of vibrations not less than multiples of 50 Hz.

BRIEF DESCRIPTION OF THE DRAWINGS

The characteristics and advantages of the invention will become apparent from the description which follows, by way of non-limiting example, with reference to the accompanying drawing, in which.

DETAILED DESCRIPTION OF THE INVENTION

In the description which follows, the invention is described more particularly applied to an inductive load such as an electric motor, but it is quite evident that this invention is applicable to any load of resistive character such as an electrical heating resistance.

Figure 1:
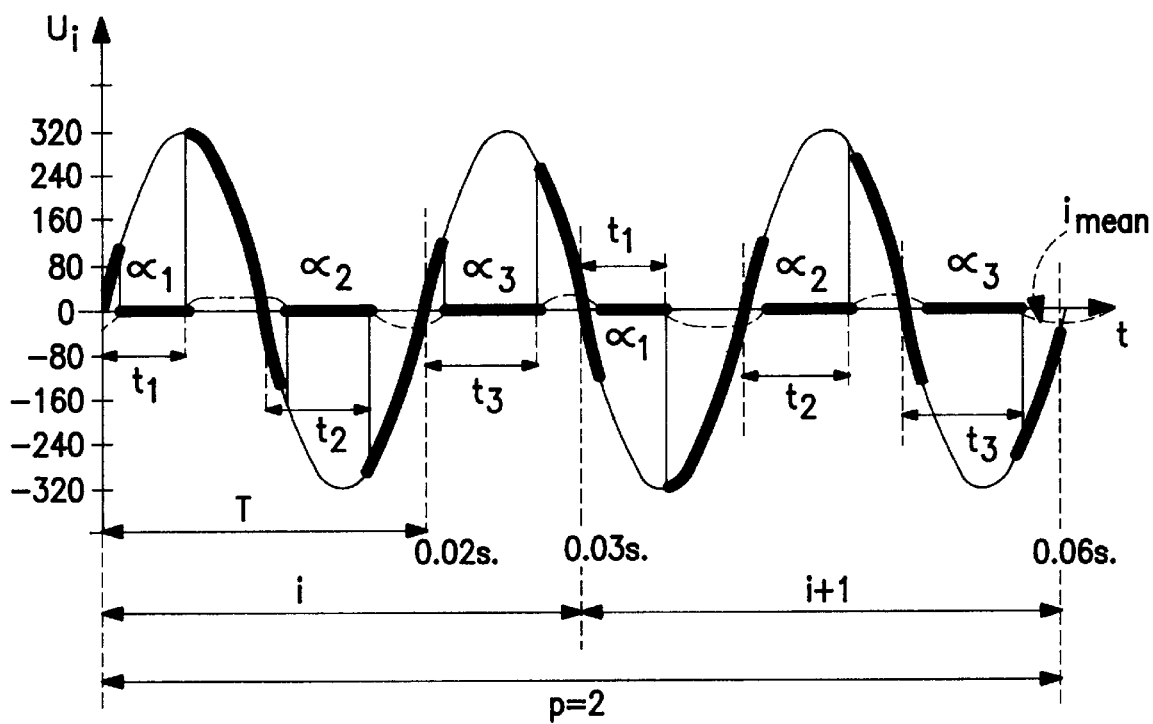
FIG. 1 is a chronogram of the instantaneous voltage as a function of time, for a power control according to the invention.

The chronogram shown in FIG. 1 comprises time t on the abscissa and instantaneous voltage on the ordinate for controlling a load 1 such as a motor. Such a motor used, for example, in a vacuum pump is supplied by an ac voltage source U=230 V of period T=20 ms via a system of generalized phase regulation such as for example a continuous variator comprising an electronic switch 2 of the TRIAC type and for which the power has been adjusted to 500 Watts.

As will be seen in FIG. 1, there is shown in broken line the mean current through the load which, by the control process of the invention, is zero.

According to the invention, for a preliminarily fixed nominal power, there is delivered successively to said load (1), periodically a sequence of a whole number p of elements, p being greater than one, each element, of number i, of the sequence being characterized by the whole number $n_i$ of half-period T/2 during which the ac voltage U is chopped according to different consecutive phase angles $\alpha_i$ from $\alpha_1$ to $\alpha_n$ corresponding respectively to durations $t_i$ from $t_1$ to $t_n$ during which the load (1) is not supplied, the phase angles $\alpha_i$ of the element i and $\alpha_{i+1}$ of the element i+1 being similar repetitive values such that the mean current will be zero over a complete cycle whilst supplying to the load (1) the desired power.

In the illustrated example, the whole number $n_i$ of half-period T/2 is uneven and the alternate values of the angles $\alpha_i, \alpha_2, \alpha_3$ of the element i and of the element i+1, also given reference characters $\alpha_i, \alpha_2, \alpha_3$, are distributed some on the positive side and others on the negative sides of alternation.

By way of example, the different values of the phase angles $\alpha_i, \alpha_2, \alpha_3$ are given for durations $t_1$=5.3 ms; $t_2$=6.5 ms and $t_3$=7.3 ms.

As shown, after synchronization of the positive alternation, there is applied the sequence $t_1, t_2, t_3$, over the three consecutive half-periods, then synchronization is carried out for the negative alternates to apply again the sequence of similar alternate values.

Thanks to this control process, there is obtained for a motor of the universal type of 1600 W at 230 V a power variation which respects the standards as to Flicker and particularly the standards for harmonic current according to EN60555-2 whose limit, it will be recalled, is for H02=1.08 A; H03=2.3 A; H04=0.434; H05=1, etc.

This control process for the power creates mechanical vibrations limited to 44 Hz and 66 Hz. This is explained in part by the decrease in the spacing between the control angles for the insertion of an intermediate angle at 6.5 ms. Thus, two opposite constraints are taken into account, that which requires spacing the control angles to respond to the limits of current harmonics, and that which limits the spacing between the angles so as to limit the amplitude of the vibrations.

Tests according to the process described above have shown that for selected powers:
of 460 W, H01=3.7 A; H02=0.26 A; H03=2.2 A;
of 800 W, H01=4.7 A; H02=0.56 A; H03=2.16 A;
of 1050 W, H01=5.3 A; H02=0.53 A; H03=2.25 A;
of 1340 W, H01=6.35 A; H02=0.41 A; H03=2.22A.

The power control process according to the invention permits fully respecting the standards and particularly the limit of harmonic 3, considered the most troublesome.

According to another characteristic of the process of the invention, not shown, the whole number p of elements of a sequence is even, and, for example, the different values of the phase angles $\alpha_1$ and $\alpha_2$ can be given by durations $t_1$=5.3 ms and $t_2$=6.5 ms.

In this process, the durations $t_1$ and $t_2$ and hence the angles $\alpha_1$, $\alpha_2$ of the first element extending over an alternation, and the consecutive durations $t_1$ and $t_2$ of the second element extend over the other alternation, and so on.

Such an alternating control process of the two alternations better serves the power control of a resistive load such as a heating resistance used for example in a cooking apparatus or a hair dryer.

According to still another control law of the process of the invention, not shown, the phase angles i+1 have alternate inverse values, for example $\alpha_1$, $\alpha_2$, $\alpha_1$, $\alpha_2$ for the first element and $\alpha_2$, $\alpha_1$, $\alpha_2$, $\alpha_1$ for the second consecutive element thus constituting a sequence of an even number of half-periods T/2.

Thus, a succession of control angles is followed immediately by the same succession but which is inverse, so as to oppose to the vibration frequencies generated by the first sequence, the second sequence generating the same frequencies but of opposed phase.

Figure 2:
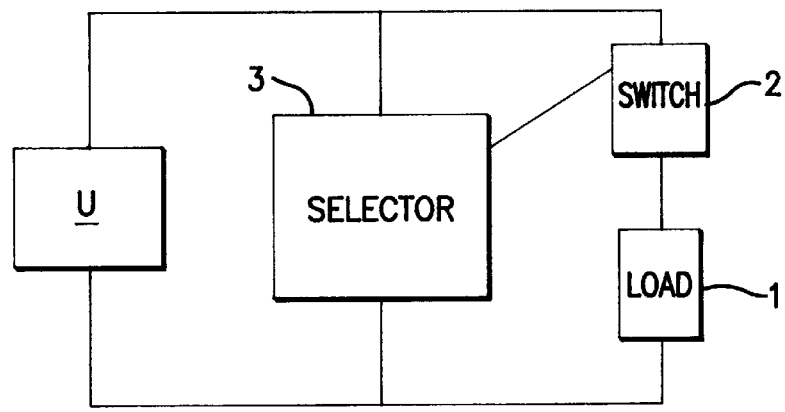
FIG. 2 is a synoptic diagram of a power control device according to the invention.

The different processes described above are used in an electric circuit (see FIG. 2) comprising, in addition to the electronic switch 2, a selector means 3 adapted to select the durations $t_i$ and to generate control signals of said switch so as to fix respectively the values of the phase angles $\alpha_i$ and $\alpha_{i+1}$.

We claim:

1. Process for controlling the power supplied to a load supplied by an AC voltage source U of period T via a generalized phase control system, which comprises:
for a preliminarily fixed nominal power, delivering successively to said load, periodically a sequence of a whole number p of elements, p being greater than one, each element, of numeral i, of the sequence being characterized by a whole number $n_i$ of half-period T/2 during which the AC voltage U is chopped according to different consecutive phase angles $\alpha_i$ from $\alpha_1$ to an corresponding respectively to durations $t_i$ from $t_1$ to $t_n$ during which the load is not supplied, the phase angles $\alpha_i$ of the element i and $\alpha_{i+1}$ of the element i+1 having similar repetitive values such that a mean current will be zero over a complete cycle whilst supplying to the load a power.

2. Control process according to claim 1, wherein the number p of elements of a sequence is even.

3. Control process according to claim 1, wherein the whole number $n_i$ of half-periods T/2 is uneven.

4. Control process according to claim 1, wherein the similar repetitive values of the phase angles $\alpha_i$ of the elements i and i+1 are distributed over some the positive alternation, others over the negative alternation.

5. Control process according to claim 1, wherein the phase angles $\alpha_i$ of the element i and $\alpha_{i+1}$ have inverse repetitive values.

6. Control process according to claim 1, wherein the load is a universal motor.

7. Device for controlling the power supplied to a load supplied by an AC voltage source U of period T via a generalized phase control system, comprising:
an electronic switch mounted in series with the load at the terminals of a source of AC voltage U;
selector means having an output connected to said switch and adapted to select durations $t_i$ and to generate control signals for the electronic switch so as to deliver successively to said load, periodically a sequence of a whole number p of elements, p being greater than one, each element, of numeral i, of the sequence being characterized by a whole number $n_i$ of half-period T/2 during which the AC voltage U is chopped according to different consecutive phase angles $\alpha_i$ from $\alpha_1$ to $\alpha_n$ corresponding respectively to durations $t_i$ from $t_1$ to $t_n$ during which the load is not supplied, the phase angles $\alpha_i$ of the element i and $\alpha_{i+1}$ of the element i+1 having similar repetitive values such that a mean current will be zero over a complete cycle whilst supplying to the load a power.

* * * * *